(12) United States Patent
Rogers

(10) Patent No.: US 10,125,916 B1
(45) Date of Patent: Nov. 13, 2018

(54) CONTAINER AND INTERLOCKING PLATFORM APPARATUS

(71) Applicant: James Stanley Rogers, Gretna, NE (US)

(72) Inventor: James Stanley Rogers, Gretna, NE (US)

( * ) Notice: Subject to any disclaimer, the term of this patent is extended or adjusted under 35 U.S.C. 154(b) by 0 days.

(21) Appl. No.: 15/601,973

(22) Filed: May 22, 2017

Related U.S. Application Data

(60) Provisional application No. 62/339,498, filed on May 20, 2016.

(51) Int. Cl.
*F16M 11/22* (2006.01)
*B65D 25/20* (2006.01)

(52) U.S. Cl.
CPC ............ *F16M 11/22* (2013.01); *B65D 25/20* (2013.01); *F16M 2200/08* (2013.01)

(58) Field of Classification Search
CPC .... F16M 11/22; F16M 2200/08; B65D 25/20; B65F 1/141; B01F 15/00733; B01F 15/0074; B44D 3/14
USPC .................................................. 248/346.03
See application file for complete search history.

(56) References Cited

U.S. PATENT DOCUMENTS

| | | | |
|---|---|---|---|
| 1,778,175 A | 10/1930 | Thune | |
| 2,564,834 A | 8/1951 | Devine et al. | |
| 2,851,185 A | 9/1958 | Taylor | |
| 2,853,261 A | 9/1958 | Loeb | |
| 2,936,926 A * | 5/1960 | Miller | B65F 1/141 220/571 |
| 3,516,571 A | 6/1970 | Roper et al. | |
| 3,606,074 A | 9/1971 | Hayes | |
| 3,854,582 A * | 12/1974 | Martinelli | B65D 21/022 206/508 |
| 4,151,910 A * | 5/1979 | Yasur | B65D 25/06 206/216 |
| 4,311,238 A | 1/1982 | Smith | |
| 4,705,172 A | 11/1987 | Gage | |
| 4,733,790 A * | 3/1988 | Stein | B44D 3/128 220/23.83 |
| 4,796,757 A | 1/1989 | Strunkmann-Meister | |
| 4,930,653 A * | 6/1990 | Machado | B65F 1/141 220/23.4 |
| 5,143,338 A | 9/1992 | Eberlin | |
| 5,150,804 A | 9/1992 | Blanchet et al. | |
| 5,232,188 A | 8/1993 | Troncone | |
| 6,361,001 B1 | 3/2002 | Durand | |

(Continued)

*Primary Examiner* — Anita M King
(74) *Attorney, Agent, or Firm* — Suiter Swants pc llo

(57) ABSTRACT

An apparatus includes a container. The container includes one or more sidewalls and a base portion coupled to the one or more sidewalls, the base portion including at least one recess disposed in a bottom surface of the base portion, the at least one recess having a depth less than the thickness of the base portion. The apparatus also includes a platform. The platform includes a recess disposed in a top surface of the platform and having a depth less than the thickness of the platform, the recess dimensioned to receive at least the base portion. The platform includes at least one projection projecting from a recessed top surface within the recess disposed in the top surface of the platform. The at least one recess disposed in the bottom surface of the base portion is dimensioned to receive, and at least partially interlock with, the at least one projection.

20 Claims, 10 Drawing Sheets

(56) References Cited

U.S. PATENT DOCUMENTS

| | | |
|---|---|---|
| 6,464,184 B1 | 10/2002 | Lytle |
| 7,018,090 B2 | 3/2006 | Moore |
| 7,178,766 B2 | 2/2007 | Forshee et al. |
| 7,258,312 B2 | 8/2007 | Grosse |
| 7,261,262 B2 | 8/2007 | Dunson |
| 7,651,060 B2 | 1/2010 | Roth et al. |
| 7,708,242 B1 | 5/2010 | Petrashune et al. |
| 8,011,701 B2 | 9/2011 | Taylor |
| 8,033,417 B1 | 10/2011 | Fallacaro |
| 8,136,691 B2 | 3/2012 | Saunders |
| 2003/0016586 A1 | 1/2003 | Williams |
| 2006/0202093 A1 | 9/2006 | Grosse |
| 2007/0076519 A1 | 4/2007 | Kesling |
| 2008/0224010 A1 | 9/2008 | Roth et al. |

\* cited by examiner

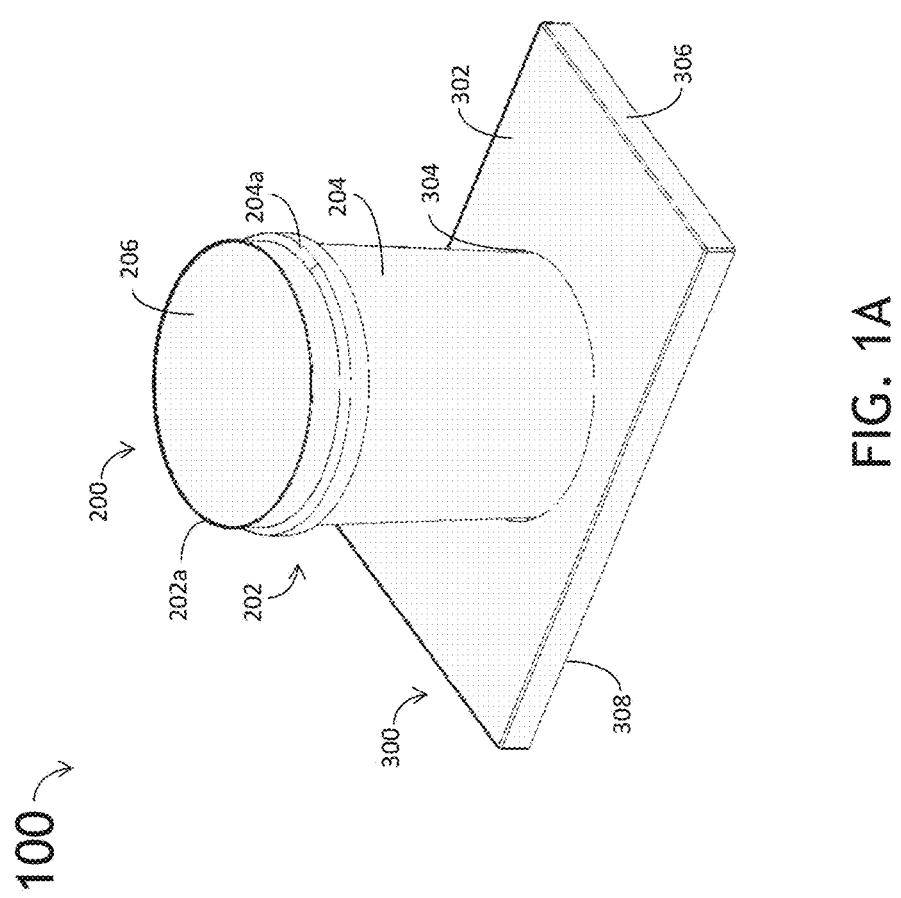

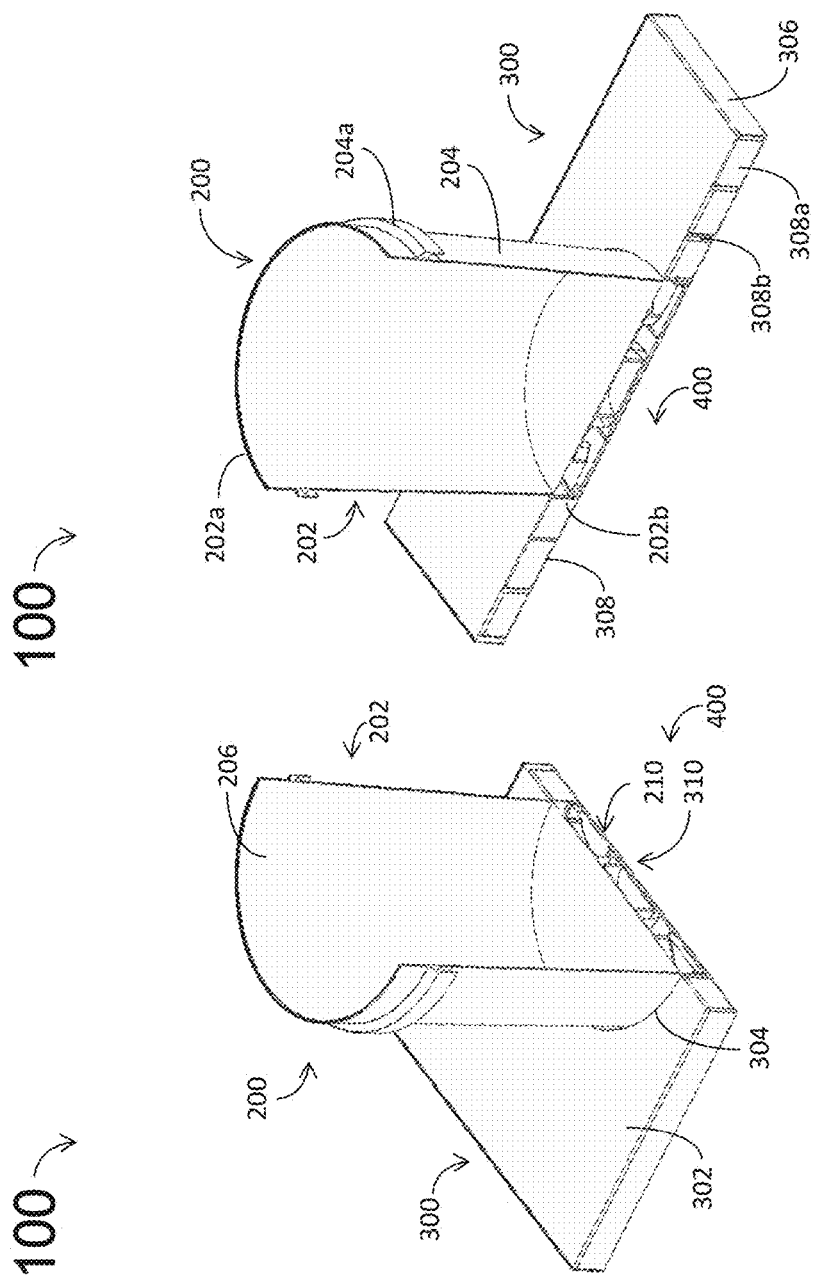

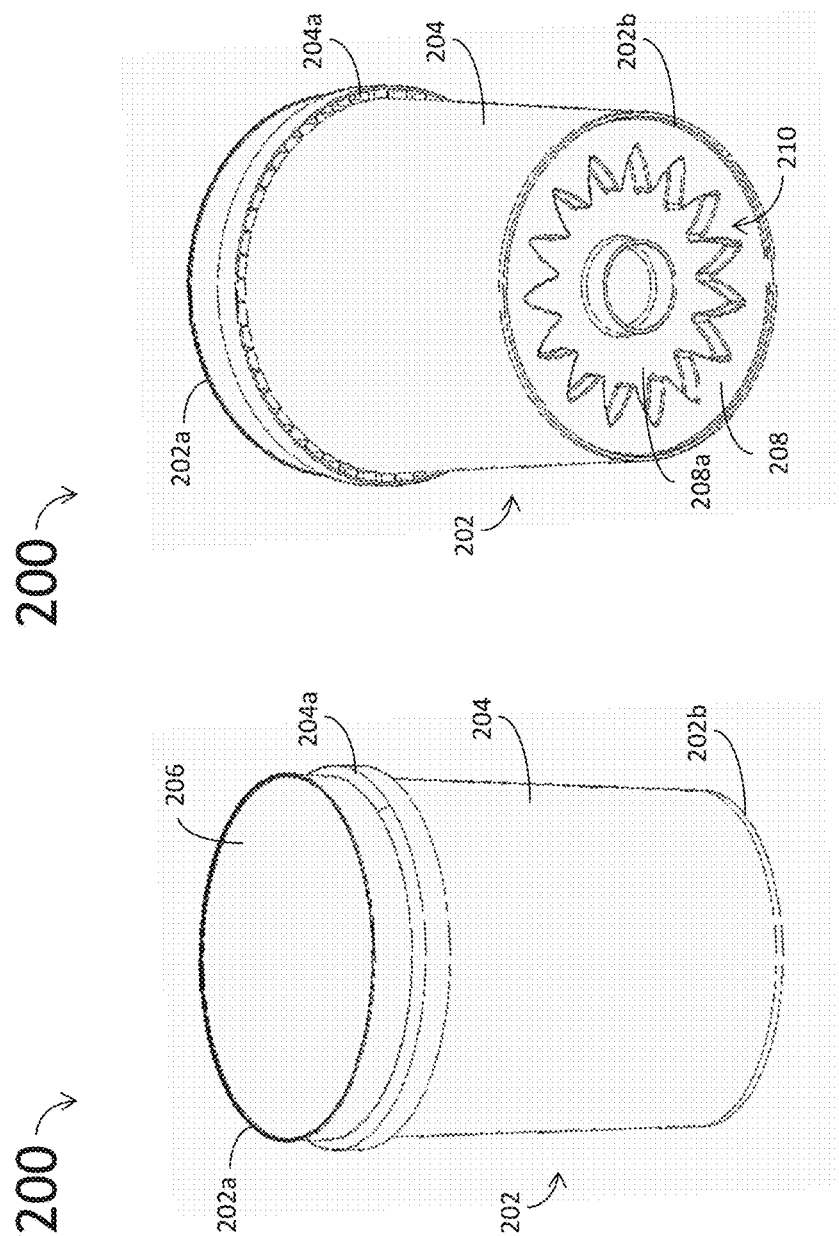

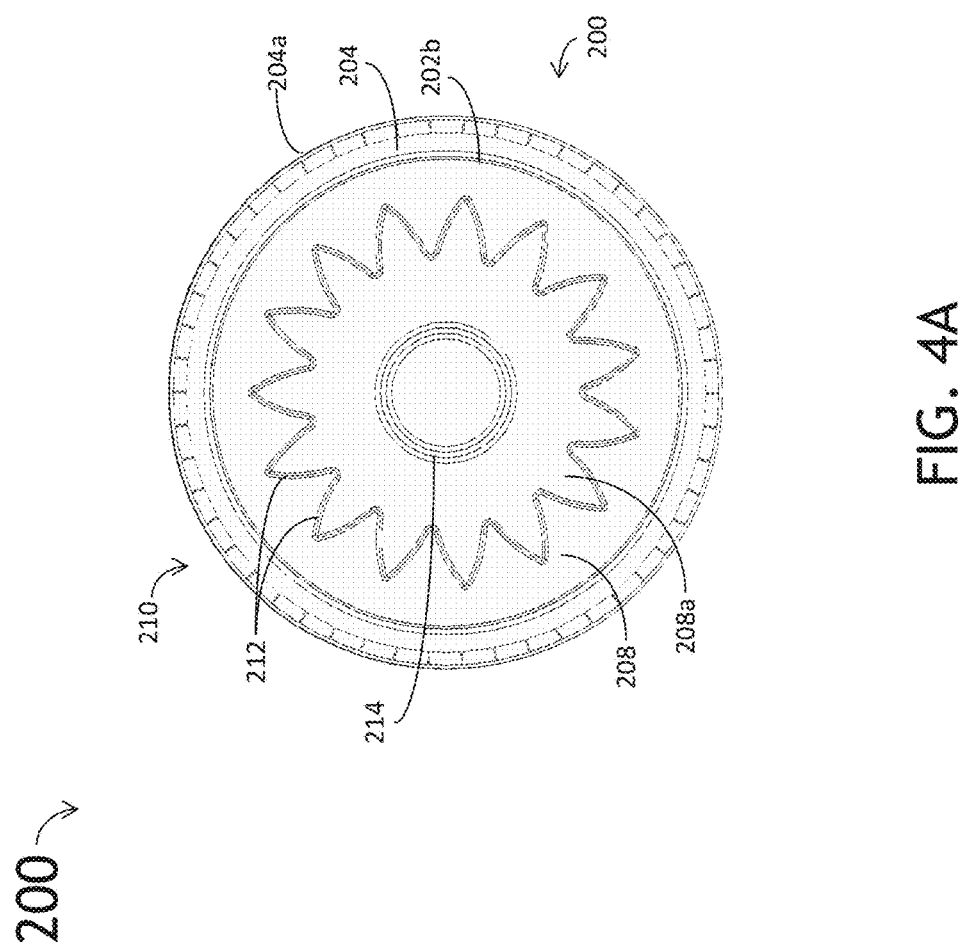

CONTAINER AND INTERLOCKING PLATFORM APPARATUS

CROSS-REFERENCE TO RELATED APPLICATIONS

The present application claims priority under 35 U.S.C. § 119(e) to U.S. Provisional Patent Application Ser. No. 62/339,498, filed May 20, 2016, entitled MIXING BUCKET WITH INTERLOCKING MIXING PLATFORM, naming James Stanley Rogers as inventor, which is incorporated herein by reference in the entirety.

TECHNICAL FIELD

The present invention generally relates to containment units, and in particular, to an apparatus including a container and an interlocking platform.

BACKGROUND

Mixing material in a container often requires an operator to stabilize the container to prevent it from shifting when subjected to the rotation of a mixing device and/or movement of the material within the container. However, the stabilizing forces applied by the operator often inadequately stabilize the container, resulting in the container shifting under the operator's control. Shifting of the container may cause the container to injure the operator. Shifting of the container may also cause the operator to lose control of the device used to mix the material within the container, potentially damaging the device or injuring the operator. Additionally, an operator having to stabilize the container is often confined to a small area of movability, which may cause injury to the operator and may prevent the operator from functioning at the full range necessary to mix the material within the container.

Known methods of stabilizing a container on a platform include coupling the container to the platform via an attachment assembly including a clasp, a clamp, or a fastener component. Additionally, known methods of stabilizing a container on a platform also require disengaging or uncoupling the container from the platform with one or more tools. Further, known methods of stabilizing a container on a platform include an assembly that utilizes a compressive force to hold the container in place. Further, known methods of stabilizing a container on a platform include an anchoring assembly, where the anchoring assembly is free-standing, coupled to a secondary component, or coupled to the ground. These various known methods inhibit the easy removal of the container from the support platform, costing the operator time and requiring the operator to expend extra effort to remove the container from the support platform.

As such, it would be desirable to provide a system that cures the defects of the shortcomings described above.

SUMMARY

An apparatus is disclosed, in accordance with one or more embodiments of the present disclosure. In one illustrative embodiment, the apparatus includes a container. In another illustrative embodiment, the container includes one or more sidewalls. In another illustrative embodiment, the container includes a base portion coupled to the one or more sidewalls. In another illustrative embodiment, the base portion includes at least one recess disposed in a bottom surface of the base portion. In another illustrative embodiment, the at least one recess disposed in the bottom surface of the base portion has a depth less than the thickness of the base portion. In another illustrative embodiment, the apparatus includes a platform. In another illustrative embodiment, the platform includes a recess disposed in a top surface of the platform. In another illustrative embodiment, the recess disposed in the top surface of the platform has a depth less than the thickness of the platform. In another illustrative embodiment, the recess is dimensioned to receive at least the base portion. In another illustrative embodiment, the platform includes at least one projection projecting from a recessed top surface within the recess disposed in the top surface of the platform. In another illustrative embodiment, the at least one recess disposed in the bottom surface of the base portion is dimensioned to receive, and at least partially interlock with, the at least one projection.

An apparatus is disclosed, in accordance with one or more embodiments of the present disclosure. In one illustrative embodiment, the apparatus includes a container. In another illustrative embodiment, the container includes one or more sidewalls. In another illustrative embodiment, the container includes a base portion coupled to the one or more sidewalls. In another illustrative embodiment, the base portion includes a recess disposed in a bottom surface of the base portion. In another illustrative embodiment, the recess disposed in the bottom surface of the base portion has a depth less than the thickness of the base portion. In another illustrative embodiment, the container includes at least one projection projecting from a recessed base portion surface within the recess disposed in the bottom surface of the base portion. In another illustrative embodiment, the apparatus includes a platform. In another illustrative embodiment, the platform includes at least one recess disposed in a top surface of the platform. In another illustrative embodiment, the at least one recess disposed in the top surface of the platform has a depth less than the thickness of the platform. In another illustrative embodiment, the at least one recess disposed in the top surface of the platform is dimensioned to receive at least the base portion. In another illustrative embodiment, the at least one recess disposed in the top surface of the platform is dimensioned to receive, and at least partially interlock with, the at least one projection.

An apparatus is disclosed, in accordance with one or more embodiments of the present disclosure. In one illustrative embodiment, the apparatus includes a container. In another illustrative embodiment, the container includes one or more sidewalls. In another illustrative embodiment, the container includes a base portion coupled to the one or more sidewalls. In another illustrative embodiment, a cross-section of the base portion is non-circular. In another illustrative embodiment, the apparatus includes a platform. In another illustrative embodiment, the platform includes a recess disposed in a top surface of the platform. In another illustrative embodiment, the recess has a depth less than the thickness of the platform. In another illustrative embodiment, a recessed top surface is formed within the recess disposed in the top surface of the platform at the depth less than the thickness of the platform. In another illustrative embodiment, a cross-section of the recess disposed in the top surface of the platform is non-circular. In another illustrative embodiment, the recess disposed in the top surface of the platform is dimensioned to receive, and at least partially interlock with, the base portion.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 1A illustrates an isometric view of an apparatus including a container and a platform, in accordance with one or more embodiments of the present disclosure.

FIG. 1C illustrates a cut-away isometric view of an apparatus including a container and a platform, in accordance with one or more embodiments of the present disclosure.

FIG. 1D illustrates a cut-away isometric view of an apparatus including a container and a platform, in accordance with one or more embodiments of the present disclosure.

FIG. 2A illustrates a view oriented on a top and an exterior sidewall of a container, in accordance with one or more embodiments of the present disclosure.

FIG. 2B illustrates a view oriented on a bottom and an exterior sidewall of a container, in accordance with one or more embodiments of the present disclosure.

FIG. 4A illustrates a bottom view of a container including a component of an interlocking assembly, in accordance with one or more embodiments of the present disclosure.

DETAILED DESCRIPTION OF THE INVENTION

Figure 1B:
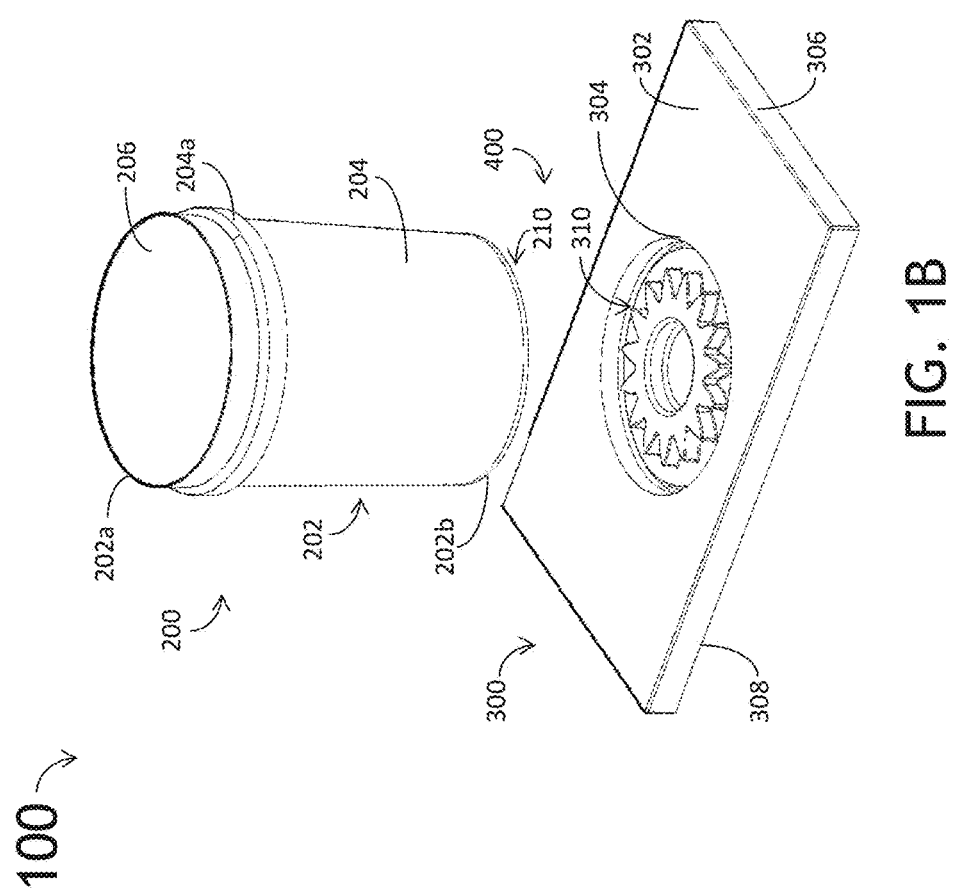
FIG. 1B illustrates an exploded isometric view of an apparatus including a container and a platform, in accordance with one or more embodiments of the present disclosure.
Figure 1E:
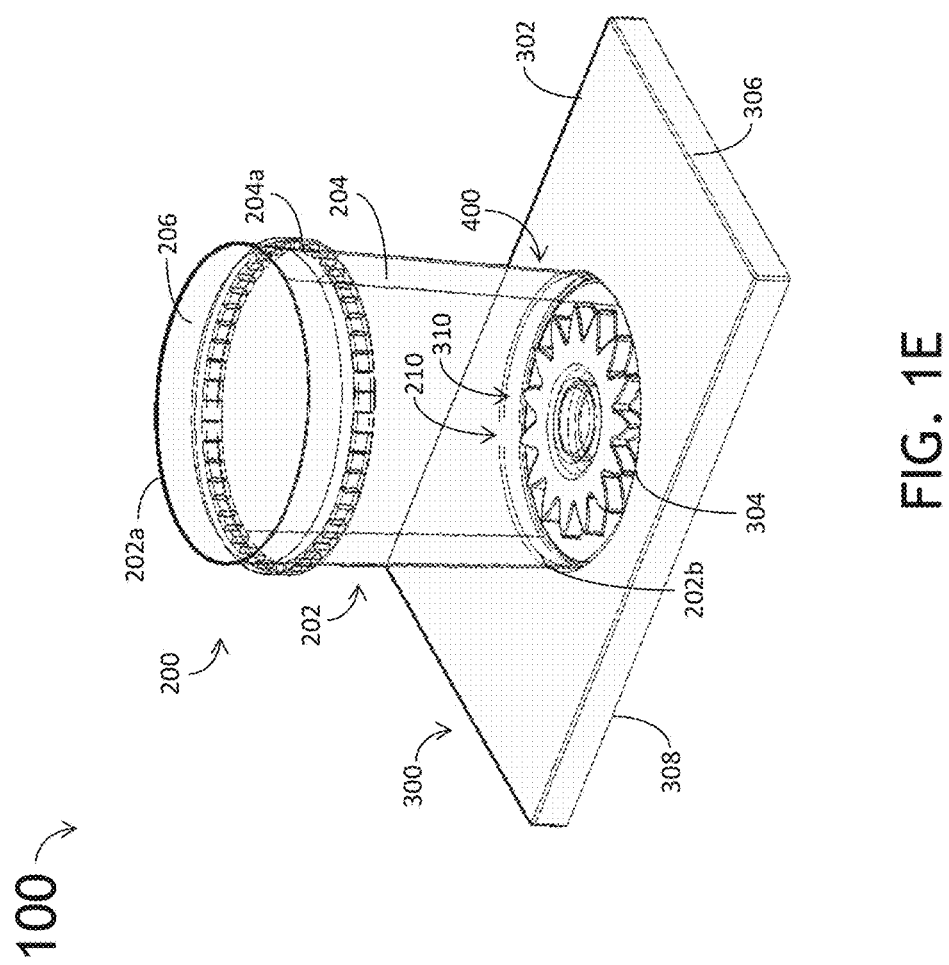
FIG. 1E illustrates an isometric view of an apparatus including a transparent container and an opaque platform, in accordance with one or more embodiments of the present disclosure.
Figure 1F:
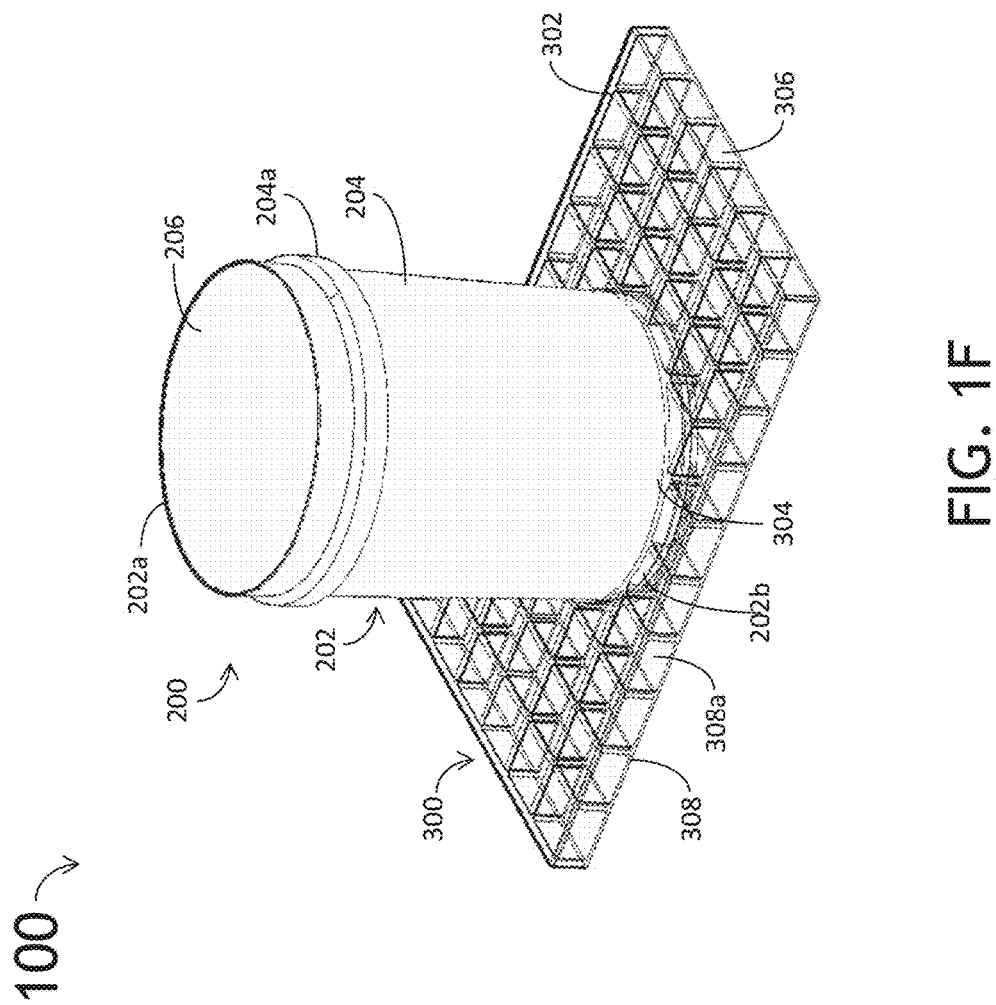
FIG. 1F illustrates an isometric view of an apparatus including an opaque container and a transparent platform, in accordance with one or more embodiments of the present disclosure.

Reference will now be made in detail to the subject matter disclosed, which is illustrated in the accompanying drawings.

Referring generally to FIGS. 1A-4B, a container and a platform is described, in accordance with one or more embodiments of the present disclosure.

Embodiments of the present disclosure are directed to an apparatus with a container and a platform. Additional embodiments of the present disclosure are also directed to an interlocking assembly that couples the container and the platform together.

FIGS. 1A-1F illustrate an container and platform apparatus 100, in accordance with one or more embodiments of the present disclosure.

In one embodiment, the apparatus 100 includes a container 200. In another embodiment, the container 200 includes a body 202. In another embodiment, the body 202 includes one or more sidewalls 204. In another embodiment, the container 200 includes a cavity 206. In another embodiment, the container 200 includes a base portion 208.

In another embodiment, the apparatus 100 includes a platform 300. In another embodiment, the platform 300 includes a top surface 302. In another embodiment, the platform 300 includes a recess 304 within the top surface 302. In another embodiment, the platform 300 includes one or more side surfaces 306. In another embodiment, the platform 300 includes a bottom surface 308.

In another embodiment, the container 200 is positioned on the platform 300. In another embodiment, the container 200 is couplable to the platform 300 via an interlocking assembly 400. In another embodiment, the interlocking assembly 400 includes a first component 210, where the first component 210 is integrated into the container 200. In another embodiment, the interlocking assembly 400 includes a second component 310, where the second component 310 is integrated into the platform 300.

In one embodiment, the apparatus 100 includes one or more containers 200 and one or more platforms 300. For example, the apparatus 100 may include a single container 200 and a single platform 300. By way of another example, the apparatus 100 may include multiple containers 200 and a single platform 300. By way of another example, the apparatus 100 may include a single container 200 and multiple platforms 300. By way of another example, the apparatus 100 may include multiple containers 200 and multiple platforms 300.

In another embodiment, where the apparatus 100 includes multiple containers 200 and/or multiple platforms 300, the multiple containers 200 and/or multiple platforms 300 are the same size and/or geometry. In this regard, the multiple containers 200 and/or multiple platforms 300 are interchangeable, such that an operator is not affected by the loss or the damaging of one of the multiple containers 200 and/or multiple platforms 300.

FIG. 2A-2B illustrates the container 200 of the apparatus 100, in accordance with one or more embodiments of the present disclosure.

In one embodiment, the container 200 includes the body 202. In another embodiment, the body 202 includes a top edge 202a. In another embodiment, the top edge 202a couples to a lid (not shown). It is noted herein, however, that the top edge 202a may instead be a top surface 202a, such that a lid is not required. Therefore, the above description should not be interpreted as a limitation on the present invention but merely an illustration.

In another embodiment, the container 200 includes a bottom edge 202b. For example, the bottom edge 202b may be inserted within the top surface 302 of the platform 300 at least a distance equal to the height of the bottom edge 202b. By way of another example, the bottom edge 202b may raise the container 200 above the top surface 302 of the platform 300 a distance equal to the height of the bottom edge 202b. It is noted herein, however, that the base portion 208 may sit directly on the top surface 302, such that the bottom edge 202b is not required. Therefore, the above description should not be interpreted as a limitation on the present invention but merely an illustration.

In another embodiment, the body 202 includes one or more sidewalls 204, where the sidewalls 204 form a cross-section of the body 202. For example, the number of sides of the base portion 208 may range from one to twelve. For instance, the body 202 may have one side, such that the cross-section of the body 202 may be, but is not limited to, a circle, an ellipse, or the like. Additionally, the body 202 may have four sides, such that the cross-section of the body 202 may be, but is not limited to, a quadrilateral, a square, a rectangle, a trapezoid, a rhombus, a parallelogram, or the like. By way of another example, the body 202 may include up to an N number of sidewalls 204, where the N number of sidewalls 204 form a body 202 having any circular or non-circular geometry cross-section known in the art.

In another embodiment, the body 202 includes no corners (i.e. the body 202 is formed from one sidewall 204). In another embodiment, the body 202 includes one or more corners (i.e. the body 202 is formed from two or more sidewalls 204). For example, the one or more corners may be pointed. By way of another example, the one or more corners may be rounded.

It is noted herein that the body 202 is preferably formed from one sidewall 204 to prevent material build-up within corners when the container 200 is utilized for a mixing application. However, it is noted herein that the container 200 is not limited to mixing applications. Additionally, it is noted herein a container 202 having a body 202 formed from multiple sidewalls 204 may be utilized for mixing applications. Therefore, the above description should not be interpreted as a limitation on the present invention but merely an illustration.

In another embodiment, the body 202 is able to contain a selected volume. For example, the selected volume may range from one cup to sixty gallons. For instance, the volume may preferably range from one gallon to ten gallons. In another embodiment, the sidewalls 204 of the body are dimensioned to contain the selected volume within the cavity 206. For example, where the selected volume is five gallons and the cross-section of the body 202 is circular, the height and the diameter of the single sidewall 204 of the body 202 may be chosen so as to allow the body to contain the five gallon volume. By way of another example, where the selected volume is five gallons and the cross-section of the body 202 is rectangular, the height and width of the four sidewalls 204 of the body 202 may be chosen so as to allow the body 202 to contain the five gallon volume. It is noted herein, however, that the sidewalls 204 of the body 202 may be dimensioned without taking into account the need to contain a selected volume. Therefore, the above description should not be interpreted as a limitation on the present invention but merely an illustration.

In one embodiment, the one or more sidewalls 204 include a rim 204a. For example, the rim 204a may allow multiple containers 200 to be partially nested and/or stacked together, such that at least a first container 200 is prevented from wedging within at least a second container 200.

In another embodiment, the container 200 includes the base portion 208. In another embodiment, the base portion 208 has one or more sides, where the one or more sides form a cross-section of the base portion 208. For example, the number of sides of the base portion 208 may range from one to twelve. For instance, the base portion 208 may have one side, such that the cross-section of the base portion 208 may be, but is not limited to, a circle, an ellipse, or the like. Additionally, the base portion 208 may have four sides, such that the cross-section of the base portion 208 may be, but is not limited to, a quadrilateral, a square, a rectangle, a trapezoid, a rhombus, a parallelogram, or the like. By way of another example, the base portion 208 may include up to an N number of sides, where the N number of sides form a base portion 208 having any circular or non-circular geometry cross-section known in the art.

In another embodiment, the body 202 and the base portion 208 has a substantially similar cross-section. For example, the body 202 and the base portion 208 may each have a circular cross-section. By way of another example, the body 202 and the base portion 208 may each have a rectangular cross-section. In another embodiment, the body 202 and the base portion 208 has a different cross-section. For example, the body 202 may have a circular cross-section, while the base portion 208 may have an elliptic cross-section. In this example, the sidewalls 204 may have an elliptic cross-section at the point where the sidewalls 204 join with the base portion 208 and a circular cross-section at a point a selected height above the base portion 208. For instance, the conversion from the elliptic cross-section to the circular cross-section may be gradual from the joining point to the point at the selected height. Additionally, the conversion from the elliptic cross-section to the circular cross-section may occur entirely at one point.

In another embodiment, the base portion 208 includes no corners (i.e. the base portion 208 is formed from one side). In another embodiment, the base portion 208 includes one or more corners (i.e. the base portion 208 is formed from two or more side). For example, the one or more corners may be pointed. By way of another example, the one or more corners may be rounded.

It is noted herein that the base portion 208 is preferably formed from one side to prevent material build-up within corners when the container 200 is utilized for a mixing application. However, it is noted herein that the container 200 is not limited to mixing applications. Additionally, it is noted herein a container 200 having a base portion 208 formed from multiple sides may be utilized for mixing applications. Therefore, the above description should not be interpreted as a limitation on the present invention but merely an illustration.

In one embodiment, the body 202 and the base portion 208 join together at a selected angle. For example, the selected angle may range from 45 degrees to 135 degrees. For instance, the selected angle may be 90 degrees. In this instance, the width and/or the diameter of the body 202 would be substantially the same as the width and/or the diameter of the base portion 208, such that the cross-sectional area of the body 202 is substantially equal to the cross-sectional area of the base portion 208. Additionally, the selected angle may be obtuse (i.e. greater than 90 degrees). In this instance, the body 202 would have a cross-section that increases in width and/or diameter relative to the width and/or the diameter of the base portion 208 as the distance between the base portion 208 and the cross-section of the body 202 increases, such that the cross-sectional area of the body 202 is greater than the cross-sectional area of the base portion 208. It is noted that this may be considered a "tapered" design, where the tapered design promotes stacking and shipping of the containers 200 in a partially-nested arrangement, and additionally promotes coupling lids to the containers 200 and stacking the lidded containers 200. Further, the selected angle may be acute (i.e. less than 90 degrees). In this instance, the body 202 would have a cross-section that decreases in width and/or diameter relative to the width and/or the diameter of the base portion 208 as the distance between the base portion 208 and the cross-section of the body 202 increases, such that the cross-sectional area of the body 202 is less than the cross-sectional area of the base portion 208. It is noted this may be considered a "flared" design.

In one embodiment, the container 200 includes a recessed base portion surface 208a. For example, the recessed base portion surface 208a may be formed when the first component 210 of the interlocking assembly 400 includes one or more recesses cut into the base portion 208 to a selected depth less than the thickness of the base portion 208. By way of another example, the recessed base portion surface 208a may be formed when material is removed from the base portion 208 to a selected depth less than the thickness of the base portion 208 to form a recess, where the recess includes the first component 210 of the interlocking assembly 400.

Figure 3A:
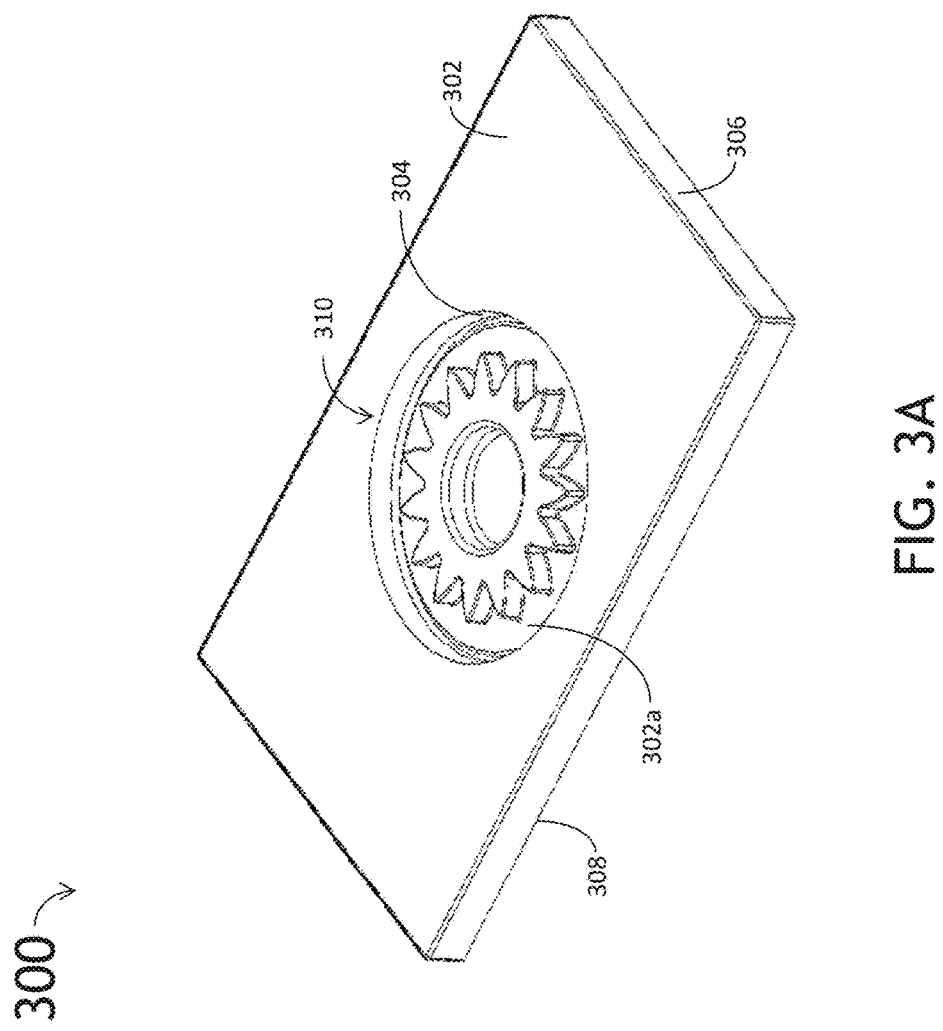
FIG. 3A illustrates an isometric view of a top of a platform, in accordance with one or more embodiments of the present disclosure.
Figure 3B:
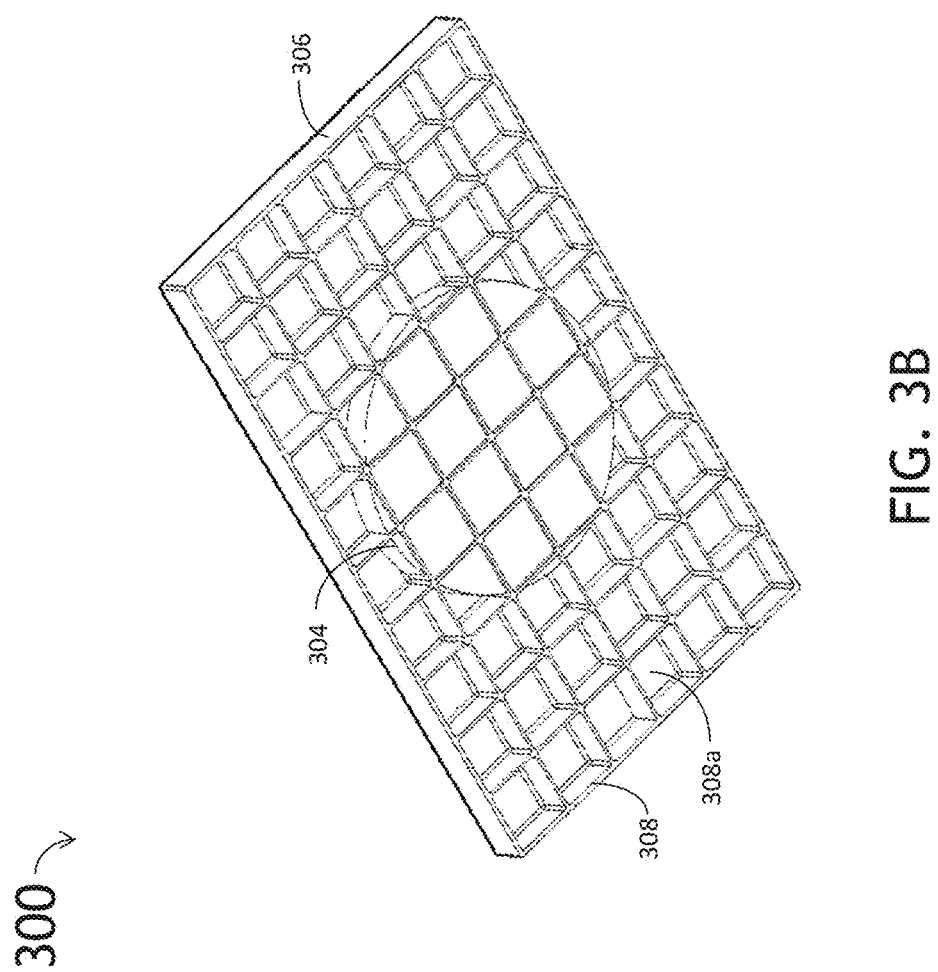
FIG. 3B illustrates an isometric view of a bottom of a platform, in accordance with one or more embodiments of the present disclosure.

FIGS. 3A and 3B illustrate the platform 300 of the apparatus 100, in accordance with one or more embodiments of the present disclosure.

In another embodiment, the platform 300 includes a top surface 302 having a defined surface width in a first direction and a defined surface length in a second direction. For example, a portion of the defined surface width on each side of the container 200 may be dimensioned to receive a selected amount of weight. By way of another example, a portion of the defined surface length on each side of the container 200 may be dimensioned to receive a selected amount of weight. In another embodiment, the operator stabilizes the platform 300 by placing a selected amount of weight on the top surface 302 within the portion of the defined surface width or the defined surface length. For example, the operator may stand on the top surface 302, where the operator places a foot on either side of the container 200 within the portion of the defined surface width or the defined surface length. By way of another example, the operator may place a weight including, but not limited to, a toolbox, a sandbag, construction material, construction scrap, a box of cable, or the like on the top surface 302 within the portion of the defined surface width or the defined surface length.

In another embodiment, defining at least one of the surface width and/or the surface length is dependent on the width and/or the diameter of the container 200 coupled to the platform 300. For example, at least one of the surface width and/or the surface length may be defined from the center of the container 200 (i.e. at least a portion of the width and/or the diameter of the container 200 is included in the defined surface width and/or the defined surface length). It is additionally noted herein at least one of the surface width and/or the surface length may be defined from the top edge 202 of the container 200 (i.e. no portion of the width and/or the diameter of the container 200 is included in the defined surface width and/or the defined surface length).

In another embodiment, the platform 300 includes a recessed top surface 302a. For example, the recessed top surface 302a may be formed when material is removed from the top surface 302 to a selected depth less than the thickness of the platform 300 (i.e. the height of the one or more side surfaces 306) to form a recess, where the recess includes the second component 310 of the interlocking assembly 400. By way of another example, the recessed top surface 302a may be from when the second component 310 of the interlocking assembly 400 includes one or more recesses cut into the top surface 302 to a selected depth less than the thickness of the platform 300 (i.e. the height of the one or more side surface 306).

In another embodiment, the platform has a recessed top surface 302a. For example, the recessed top surface 302a may be formed when material is removed from the top surface 302 to form the recess 304, where the recess 304 includes the second component 310 of the interlocking assembly 400. By way of another example, the recessed top surface 302a may be formed when the second component 310 of the interlocking assembly 400 is cut into the top surface 302.

In one embodiment, the top surface 302 includes a recess 304 having a defined depth in a third direction. For example, defining the depth is dependent on one or more design factors. For instance, the one or more design factors may include, but are not limited to, the diameter and/or width of the base portion 208 of the container 200, the diameter and/or width of the body 202 of the container 200, the tapering angle where the base portion 208 and the body 202 join together, the flaring angle where the base portion 208 and the body 202 join together, the overall thickness of the platform 300, and/or the materials used for fabrication of the container 200 and/or the platform 300. By way of another example, the defined depth may range from ¼ of an inch to 8 inches.

In another embodiment, the geometry of the recess 304 substantially conforms to the cross-sectional geometry of the base portion 208 of the container 200. For example, where the cross-sectional geometry of the base portion 208 is circular, the recess 304 is also circular. In another embodiment, the geometry of the recess 304 does not substantially conform to the geometry of the base portion 208 of the container 200, though the container 200 is still able to fit within the recess 304. For example, where the cross-sectional geometry of the base portion 208 is circular, the recess 304 may be elliptic with a small diameter equal to or greater than the diameter of the base portion 208. By way of another example, where the cross-sectional geometry of the base portion 208 is circular, the recess 304 may be rectangular with the smaller of the width or the length equal to or greater than the diameter of the base portion 208.

In another embodiment, the container 200 in set within the recess 304 such that at least a portion of the sidewalls 204 are supported by a sidewall of the recess 304. It is noted herein, however, that the platform 300 does not require a recess 304. For example, the container 200 may be couplable directly to the top surface 302 via the interlocking assembly 400, such that only the interlocking assembly 400 stabilizes the container 200 when coupled to the platform 300. Therefore, the above description should not be interpreted as a limitation on the present invention but merely an illustration.

In one embodiment, the platform 300 includes one or more side surfaces 306. For example, the number of side surfaces 306 may range from one to twelve. For instance, the platform 300 may have one side surface, such that the cross-section of the platform 300 may be, but is not limited to, a circle, an ellipse, or the like. Additionally, the platform 300 may have four side surfaces, such that the cross-section of the platform 300 may be, but is not limited to, a quadrilateral, a square, a rectangle, a trapezoid, a rhombus, a parallelogram, or the like. By way of another example, the platform 300 may include up to an N number of side surfaces 306, where the N number of side surfaces 306 form a platform 300 having any circular or non-circular geometry cross-section known in the art. By way of another example, the N number of sides surface 306 may be the edges for one or more of the top surface 302 and/or the bottom surface 308, where one or more of the top surface 302 and/or the bottom surface 308 has any circular or non-circular geometry known in the art In one embodiment, the platform 300 includes the bottom surface 308. In another embodiment, the bottom surface 308 has the same number of edges as the top surface 302. In another embodiment, the bottom surface 308 has a different number of edges as the top surface 302.

In another embodiment, the bottom surface 308 has the same defined surface width and the same defined surface length as the top surface 302. In another embodiment, the bottom surface 308 has the same defined surface width or the same defined surface length as the top surface 302. In another embodiment, the bottom surface 308 has neither the same defined surface width nor the same defined surface length as the top surface 302.

In another embodiment, the bottom surface 308 is includes one or more regions 308a separated by one or more dividers 308b. For example, the regions 308a may be arranged in a honeycomb pattern. By way of another example, the regions 308a may be arranged in a checkerboard pattern. In another embodiment, the regions 308a are generated by removing material from the bottom surface 308. For example, all regions 308a may be generated by removing material from the bottom surface 308. By way of another example, only a portion of the regions 308a may be generated by removing material from the bottom surface 308, with the remaining regions 308a retaining the bottom surface 308 material.

In one embodiment, the stand 200 and/or the platform 300 is fabricated from a metal. For example, the metal may include, but is not limited to, a ferrous metal, a non-ferrous metal, an alloy containing one or more ferrous metals, an alloy containing one or more non-ferrous metals, or an alloy containing one or more ferrous metals and one or more non-ferrous metals.

In another embodiment, the stand 200 and/or the platform 300 is fabricated from a non-metal. For example, the non-metal may include, but is not limited to, a plastic. For instance, the plastic may include, but is not limited to, a thermoplastic or a thermosetting plastic. By way of another example, the non-metal may include, but is not limited to, an elastomer. For instance, the elastomer may include, but is not limited to, a natural elastomer or a synthetic elastomer. By way of another example, the non-metal may include, but is not limited to, a ceramic. For instance, the ceramic may include, but is not limited to, a metal-based ceramic, metalloid-based ceramic, or a non-metal-based ceramic. By way of another example, the non-metal may include, but is not limited to, a composite. For instance, the composite may include, but is not limited to, a layered/laminar composite, a particulate composite, a fiber-reinforced composite, or a hybrid composite.

In another embodiment, the container 200 and the platform 300 are fabricated from the same material. In another embodiment, the container 200 and the platform 300 are fabricated from different materials.

Figure 4B:
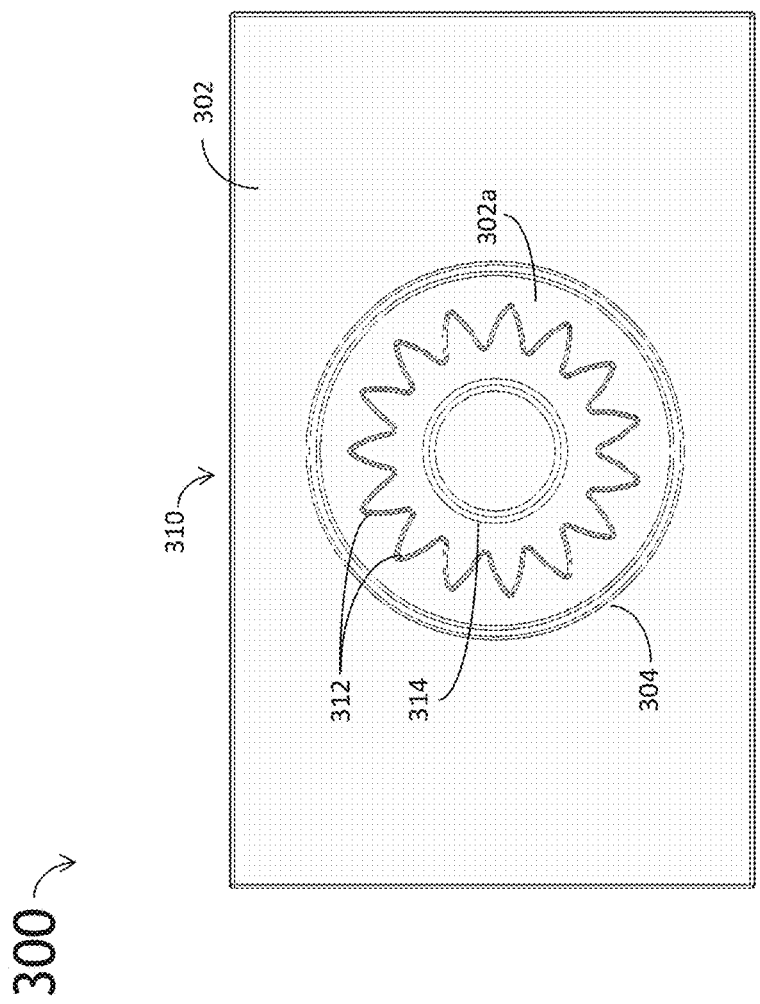
FIG. 4B illustrates a top view of a platform including a component of an interlocking assembly, in accordance with one or more embodiments of the present disclosure.

FIGS. 4A and 4B illustrate the interlocking assembly 400 of the apparatus 100, in accordance with one or more embodiments of the present disclosure.

In one embodiment, the interlocking assembly 400 is designed to fit any size and/or geometry of the container 200, so long as the container 200 remains couplable to the platform 300.

In another embodiment, the interlocking assembly 400 includes the first component 210, where the first component 210 is integrated into the container 200. In another embodiment, the first component 210 includes an interlocking portion 212. In another embodiment, the interlocking assembly 400 includes the second component 310, where the second component 310 is integrated into the platform 300. In another embodiment, the second component 310 includes an interlocking portion 312 corresponding to the interlocking portion 212 of the first component 210. Types of interlocking portions 212 and interlocking portions 312 are described in detail further herein.

In another embodiment, the first component 210 includes a guiding portion 214. In another embodiment, the second component 310 includes a guiding portion 314 corresponding to the guiding portion 214 of the first component 210. In another embodiment, at least one of the guiding portion 214 and the guiding portion 314 is set within a diameter and/or width defined by the exterior points and/or edges of the interlocking portion 212 and the interlocking portion 312, respectively.

It is noted herein that, where the top edge 202a is coupled to a lid, the second component 310 may be integrated into the lid such that the lid includes the interlocking portion 312 corresponding to the interlocking portion 212 of the first component 210. In this regard, a first container 200 with a lid and a second container 200 may interlock, where the second container 200 is stacked on top of the first container 200.

In one embodiment, the interlocking assembly 400 includes a set of projections that correspond to a set of recesses. For example, as illustrated in FIGS. 4A and 4B, the first component 210 may include a set of recesses 212, and the second component 310 may include a set of corresponding projections 312. For instance, the set of recesses 212 may not extend through the base portion 208 but instead terminate at a recessed base portion surface 208a.

It is noted herein the set of projections 312 and the set of recesses 212 may mate such that the top surfaces of the set of projections 312 come into contact with the recessed base portion surface 208a. It is additionally noted herein, however, that the set of projections 312 and the set of recesses 212 may mate such the top surfaces of the set of projections 312 are offset from the recessed base portion surface 208a a selected distance.

By way of another example, the second component 310 may include a set of recesses 312 within the recess 304, and the first component 210 may include a set of corresponding projections 212. For instance, the set of recesses 312 may not extend through the platform 300 but instead terminate as a recessed top surface 302a.

It is noted herein the set of projections 212 and the set of recesses 312 may mate such that the bottom surfaces of the set of projections 212 come into contact with the recessed top surface 302a. It is additionally noted herein, however, that the set of projections 212 and the set of recesses 312 may mate such the bottom surfaces of the set of projections 212 are offset from the recessed top surface 302a a selected distance.

In another embodiment, the projections and recess are oriented substantially parallel to one or more of the surface plane of the top surface 302, the recessed top surface 302a, the base portion 208, and/or the recessed base portion surface 208a. In another embodiment, the set of projections and the set of recesses are arranged to substantially conform to a selected geometry. For example, the set of projections and the set of recesses may be arranged to conform to the geometry of the base portion 208 of the container 200. For instance, where the base portion 208 has a circular geometry, the set of projections and the set of recesses may be arranged with a circular geometry. By way of another example, the set of projections and the set of recesses may not be arranged to conform to the geometry of the base portion 208.

In another embodiment, the set of projections 312 include a central structure, where each projection projecting from the central structure includes one or more edges. For example, the geometry of the central structure may include, but is not limited to, a circle, an ellipse, a torus, or any circular or non-circular geometry having up to an N number of sides. By way of another example, the projection may have one edge. For instance, the projection may be a tooth and/or cog with a single curved edge. By way of another example, the projection may have two edges. For instance, the projection may be a pointed tooth and/or cog. It is noted the pointed tooth and/or cog may be ¾ inch wide by ½ inch deep. By way of another example, the projection may have three edges. For instance, the projection may be a substantially square, rectangular, or trapezoidal tooth and/or cog. By way of another example, the projection may have up to an N number of edges, where the N number of edges form a projection projecting from the central structure having any circular or non-circular geometry known in the art.

It is noted herein that each projection within the set of projections 312 may not have the same number of edges. For example, the set of projections 312 may include a first subset of projections 312 having one edge, and at least a second subset of projections 312 having at least two edges.

In another embodiment, the set of projections 312 include a single projection 312 formed from one or more sides. For example, the single projection 312 may have three sides, such that the geometry of the single projection 312 may be, but is not limited to, a triangle or the like. By way of another example, the single projection 312 may have four sides, such that the geometry of the single projection 312 may be, but is not limited to, a quadrilateral, a square, a rectangle, a trapezoid, a rhombus, a parallelogram, or the like. By way of another example, the single projection 312 may have up to an N number of sides, where the N number of sides form a single projection 312 having any circular or non-circular geometry known in the art.

In another embodiment, the set of projections 312 include a set of separate projections 312. For example, each of the separate projections 312 may have up to an N number of sides, where the N number of sides form separate projections 312 having any circular or non-circular geometry known in the art.

In another embodiment, the set of recesses 212 receive and mate with the set of projections 312. In another embodiment, the set of recesses 212 complement the set of projections 312. For example, each recess 212 may include a number of edges equal to the number of edges of each respective mated projection 312.

In another embodiment, the thickness of the set of projections 312 is approximately equal to the offset height of the bottom edge 202b. In this regard, the top surface of the set of projections 312 are substantially flush with the recessed base portion surface 208a when the bottom edge 202b makes contact with the recessed top surface 302a after the set of recesses 212 mate with the set of projections 312.

In one embodiment, the container 200 is placed within the recess 304 and stops at a first depth. In another embodiment, the container 200 is rotated within the recess 304 until the set of recesses 212 align with the set of projections 312. In another embodiment, the container 200 additionally settles into the recess 304 at a second depth, the second depth being a distance approximately equal to the thickness of the set of projections 312, as the set of recesses 212 receive and mate with the set of projections 312 following alignment. In another embodiment, the mated set of recesses 212 and set of projections 312 prevent the container 200 from rotating relative to the platform 300. In another embodiment, the container 200 may be disengaged from the platform 300 by lifting the container 200 directly upward and without a rotation motion. In this regard, the apparatus 100 is self-restraining, meaning an operator, a third-party, or a supplementary component does not have to hold the container 200 in place while the operator is mixing materials together within the container 200.

In one embodiment, the interlocking assembly 400 includes two sets of teeth. For example, the first component 210 may include a first set of teeth having one or more teeth and one or more gaps between the one or more teeth, and the second component 310 may include a second set of teeth having one or more teeth and one or more gaps between the one or more teeth.

In another embodiment, the two sets of teeth are oriented substantially perpendicular to one or more of the surface plane of the top surface 302, the recessed top surface 302a, the base portion 208 and/or the recessed base portion surface 208a. In another embodiment, the projections and recesses are arranged to substantially conform to a selected geometry. For example, the projections and recesses may be arranged to conform to the geometry of the base portion 208 of the container 200. For instance, where the base portion 208 is circular in geometry, the projections and recesses may be arranged in a circular geometry. By way of another example, the projections and recesses may not be arranged to conform to the geometry of the base portion 208.

In another embodiment, the teeth in the first set of teeth are arranged to fit within the gaps in the second set of teeth, and the teeth in the second set of teeth are arranged to fit within the gaps in the first set of teeth. For example, a tooth of the first set of teeth and/or the second set of teeth may be ¾ inch wide by ½ inch tall. By way of another example, a gap within the first set of teeth and/or the second set of teeth may be ¾ inch wide by ½ inch tall. In another embodiment, the height of the teeth is approximately equal to the offset height of the bottom edge 202b. In this regard, the top surface of the first set of teeth are substantially flush with the recessed base portion surface 208a when the bottom edge 202b makes contact with the recessed top surface 302a after the first set of teeth mate with the second set of teeth.

In one embodiment, the container 200 is placed within the recess 304 and settles at a first depth. In another embodiment, the container 200 is rotated within the recess 304 until the first set of teeth on the container 200 align with the second set of teeth on the platform 300 within the recess 304. In another embodiment, the container 200 additionally settles into the recess 304 at a second depth, the second depth being a distance approximately equal to the height of the teeth, as the first set of teeth fit within the gaps and mate with the second set of teeth following alignment. In another embodiment, the mated first set of teeth and second set of teeth prevent the container 200 from rotating relative to the platform 300. In another embodiment, the container 200 may be disengaged from the platform 300 by lifting the container 200 directly upward and without a rotation motion. In this regard, the apparatus 100 is self-restraining, meaning an operator, a third-party, or a supplementary component does not have to hold the container 200 in place while the operator is mixing materials together within the container 200.

In one embodiment, the interlocking assembly 400 does not require any components (e.g. the first component 210 and/or the second component 310). In this embodiment, at least the recess 304 and the base portion 208 have a non-circular geometry cross-section. For example, the recess 304 and the base portion 208 may have an elliptic geometry cross-section. By way of another example, the recess 304 and the base portion 208 may have a cross-section formed by up to an N number of sides, where the N number of sides form a recess 304 and the base portion 208 having any circular or non-circular geometry cross section known in the art. In another embodiment, the interlocking assembly 400 is generated by the natural resistance generated when the base portion 208 makes contact with the recess 304.

In one embodiment, the container 200 is placed within the recess 304 at a depth equal to or greater than the height of the bottom edge 202b. In another embodiment, the container 200 is rotated within the recess 304 until the long diameter of the elliptic base portion 208 comes into contact with a side wall of the recess 304. In another embodiment, the base portion 208 coming into contact with a side wall of the recess 304 prevents the container 200 from rotating relative to the platform 300. In another embodiment, the container 200 may be disengaged from the platform 300 by lifting the container 200 directly upward and without a rotation motion. In this regard, the apparatus 100 is self-restraining, meaning an operator, a third-party, or a supplementary component does not have to hold the container 200 in place while the operator is mixing materials together within the container 200.

Although embodiments of the present disclosure are directed to the body 202, the base portion 208, the platform 300, and/or the recess 304 as having a cross-section with a circular geometry, it is noted herein that the cross-section of the body 202, the base portion 208, the platform 300, and/or the recess 304 may have a cross-section with any circular or non-circular geometry known in the art. Additionally, although embodiments of the present disclosure are directed to the top surface 302 and/or the bottom surface 308 as having a circular geometry, it is noted herein that the top surface 302 and/or the bottom surface 308 may have any circular or non-circular geometry known in the art. Therefore, the above description should not be interpreted as a limitation on the present invention but merely an illustration.

Advantages of the present disclosure include an apparatus with a container and a platform with an interlocking assembly that holds the container at a selected location on and/or within the platform, coupling the container to the platform without the need for an operator or a third-party to stabilize the container. Advantages of the present disclosure also include an interlocking assembly that may be engaged with gravity, such that the use of an attachment assembly, a tool, a compressive force, or an anchoring assembly to stabilize the container is not required.

Advantages of the present disclosure also include providing greater control when mixing material within a container, as the operator does not have to sacrifice a hand to hold the container in place. Advantages of the present disclosure also include a more comfortable position when mixing material within the container, as the operator does not have to hold the container in place by providing pressure and/or friction with their legs to hold the container in place.

Contemplated uses for one or more embodiments of the present disclosure include an apparatus with a mixing bucket and an interlocking mixing stand for mixing material on a construction site such as, but not limited to, concrete. Additional contemplated uses for one or more embodiments of the present disclosure include an apparatus with a drum and an interlocking platform for mixing feed, wet or dry fertilizer, dirt, and similar farm and/or agricultural-based materials. Additional contemplated uses for one or more embodiments of the present disclosure include an apparatus with a can and an interlocking shaking stand for mixing paint. Additional contemplated uses for one or more embodiments of the present disclosure include an apparatus with a bowl and interlocking stand such as, but not limited to, a kitchen stand mixer, for mixing food ingredients. Contemplated uses for one or more embodiments of the present disclosure also include an apparatus with a container and an interlocking stand, where the container is filled with one or more types of material needing to be mixed together to some degree of homogeneity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed:

1. An apparatus, comprising:
    a container, comprising:
        one or more sidewalls;
        a base portion coupled to the one or more sidewalls; and
        at least one interlocking recess of an interlocking assembly disposed in a bottom surface of the base portion, the at least one interlocking recess including a recessed base portion surface at a depth less than the thickness of the base portion; and
    a platform, comprising:
        a recess disposed in a top surface of the platform, the recess including a recessed platform surface at a depth less than the thickness of the platform, the recess disposed in the top surface of the platform being configured to receive at least a portion of the base portion of the container; and
        at least one interlocking projection of the interlocking assembly projecting from the recessed platform surface within the recess disposed in the top surface of the platform,
    wherein the at least one interlocking recess disposed in the bottom surface of the base portion is configured to at least partially receive and mate with the at least one interlocking projection,
    wherein the interlocking assembly is configured to prevent the container from rotating relative to the platform when the at least one interlocking recess and the at least one interlocking projection are mated.

2. The apparatus in claim 1, wherein the one or more sidewalls form a container body, wherein the recess disposed in the top surface of the platform is configured to receive at least a portion of the container body.

3. The apparatus in claim 2, wherein at least one of a cross-section of the recess disposed in the top surface of the platform, a cross-section of the base portion, or a cross-section of the container body formed by the one or more sidewalls, is non-circular to prevent the container from rotating relative to the platform.

4. The apparatus in claim 1, wherein the at least one interlocking projection includes at least one guide recess, wherein the at least one interlocking recess includes at least one guide projection projecting from the recessed base portion surface, wherein the at least one guide recess is configured to at least partially receive the at least one guide projection.

5. The apparatus in claim 1, wherein the at least one interlocking recess disposed in the bottom surface of the base portion is configured to at least partially receive and mate with the at least one interlocking projection such that a top surface of the at least one interlocking projection contacts the recessed base portion surface of the container.

6. The apparatus in claim 1, wherein the at least one interlocking recess disposed in the bottom surface of the base portion is configured to at least partially receive and mate with the at least one projection such that a top surface of the at least one interlocking projection is offset a selected distance from the recessed base portion surface of the container.

7. The apparatus in claim 1, wherein the at least one interlocking projection is set on a plane substantially parallel to a plane of the top surface of the platform, wherein the at least one interlocking recess disposed in the bottom surface of the base portion is set on a plane substantially parallel to a plane of the bottom surface of the base portion.

8. The apparatus in claim 1, wherein the at least one interlocking projection is a tooth of a first set of teeth, wherein the first set of teeth is set on a plane that is substantially perpendicular to a plane of the top surface of the platform, wherein the at least one interlocking recess disposed in the bottom surface of the base portion is a gap within a second set of teeth, wherein the second set of teeth is set on a plane that is substantially perpendicular to a plane of the bottom surface of the base portion.

9. An apparatus, comprising:
   a container, comprising:
      one or more sidewalls;
      a base portion coupled to the one or more sidewalls, the base portion including a recess disposed in a bottom surface of the base portion, the recess including a recessed base portion surface at a depth less than the thickness of the base portion; and
      at least one interlocking projection of an interlocking assembly projecting from the recessed base portion surface within the recess disposed in the bottom surface of the base portion; and
   a platform, comprising:
      at least one interlocking recess of the interlocking assembly disposed in a top surface of the platform, the at least one interlocking recess including a recessed platform surface at a depth less than the thickness of the platform;
   wherein the at least one interlocking recess disposed in the top surface of the platform is configured to at least partially receive and mate with the at least one interlocking projection,
   wherein the interlocking assembly is configured to prevent the container from rotating relative to the platform when the at least one interlocking recess and the at least one interlocking projection are mated.

10. The apparatus in claim 9, the platform comprising at least one recess disposed in the top surface of the platform, wherein the one or more sidewalls form a container body, wherein the at least one recess disposed in the top surface of the platform is configured to receive one or more of at least a portion of the base portion of the container or at least a portion of the container body.

11. The apparatus in claim 10, wherein at least one of a cross-section of the at least one recess disposed in the top surface of the platform, a cross-section of the base portion, or a cross-section of the container body formed by the one or more sidewalls, is non-circular to prevent the container from rotating relative to the platform.

12. The apparatus in claim 9, the at least one interlocking projection includes at least one guide recess, wherein the at least one interlocking recess includes at least one guide projection projecting from the recessed platform surface, wherein the at least one guide recess is configured to at least partially receive the at least one guide projection.

13. The apparatus in claim 9, wherein the at least one interlocking recess disposed in the top surface of the platform is configured to at least partially receive and mate with the at least one interlocking projection such that a bottom surface of the at least one interlocking projection contacts the recessed platform surface.

14. The apparatus in claim 9, wherein the at least one interlocking recess disposed in the top surface of the platform is configured to at least partially receive and mate with the at least one interlocking projection such that a bottom surface of the at least one interlocking projection is offset a selected distance from the recessed platform surface.

15. The apparatus in claim 9, wherein the at least one interlocking projection is set on a plane substantially parallel to a plane of the bottom surface of the base portion, wherein the at least one interlocking recess disposed in the top surface of the platform is set on a plane substantially parallel to a plane of the top surface of the platform.

16. The apparatus in claim 9, wherein the at least one interlocking projection is a tooth of a first set of teeth, wherein the first set of teeth is set on a plane that is substantially perpendicular to a plane of the bottom surface of the base portion, wherein the at least one interlocking recess disposed in the top surface of the platform is a gap within a second set of teeth, wherein the second set of teeth is set on a plane that is substantially perpendicular to a plane of the top surface of the platform.

17. An interlocking assembly, comprising:
   at least one interlocking recess; and
   at least one interlocking projection,
   wherein the at least one interlocking recess is configured to at least partially receive and mate with the at least one interlocking projection,
   wherein one or more of the at least one interlocking recess or the at least one interlocking projection are couplable to one or more of a container or a platform,
   wherein the at least one interlocking recess and the at least one interlocking projection is configured to prevent the container from rotating relative to the platform when the at least one interlocking recess and the at least one interlocking projection are mated.

18. The apparatus in claim 17, wherein the at least one interlocking recess is disposed in a bottom surface of a base portion of the container, wherein the at least one interlocking projection is projected from a recessed platform surface of a recess disposed in a top surface of the platform.

19. The apparatus in claim 17, wherein the at least one interlocking recess is disposed in a top surface of the platform, wherein the at least one interlocking projection is projected from a recessed base portion surface within a recess disposed in a bottom surface of a base portion of the container.

20. The apparatus in claim 17, wherein the at least one interlocking projection is a tooth of a first set of teeth set on a plane that is substantially perpendicular to a plane of a top surface of the platform, wherein the at least one interlocking recess is a gap within a second set of teeth set on a plane that is substantially perpendicular to a plane of a bottom surface of a base portion of the container.

* * * * *